United States Patent [19]
Speckman et al.

[11] 4,175,719
[45] Nov. 27, 1979

[54] MICROFILM CASSETTE MODULE

[75] Inventors: Lawrence Speckman, Westland, Mich.; Jack Beery, Fairport, N.Y.

[73] Assignee: Burroughs Corporation, Detroit, Mich.

[21] Appl. No.: 887,594

[22] Filed: Mar. 17, 1978

[51] Int. Cl.² ............................................ G03B 23/02
[52] U.S. Cl. .................................. 242/197; 242/71.2; 242/199; 352/78 R
[58] Field of Search ............. 242/197, 199, 200, 198, 242/71.1, 71.2; 400/207, 208, 208.1, 196, 196.1; 352/72, 78 R

[56] References Cited

U.S. PATENT DOCUMENTS

| | | | |
|---|---|---|---|
| 1,871,236 | 8/1932 | Proctor | 242/199 |
| 2,505,783 | 5/1950 | Mellert | 242/71.2 X |
| 3,425,532 | 2/1969 | Dannatt | 242/71.2 |
| 3,701,495 | 10/1972 | Holliday | 242/199 |
| 4,013,160 | 3/1977 | Colecchi et al. | 242/199 |

*Primary Examiner*—George F. Mautz
*Attorney, Agent, or Firm*—Charles P. Sammut; David R. Syrowik; Carl Fissell, Jr.

[57] ABSTRACT

An assembly for housing microfilm is provided. The assembly includes a first cartridge, a second cartridge, and a connector assembly for detachably connecting the first cartridge to the second cartridge along an offset axis of the assembly. The first and second cartridges have a base plate and a cover plate secured together by a second connector assembly. The first connector assembly pivotally connects the two base plates together at a pivot point to allow each of the cartridges to rotate about the offset axis. The offset axis extends through the pivot point and is perpendicular to the plane formed by the junction of the first cartridge and the second cartridge.

5 Claims, 3 Drawing Figures

MICROFILM CASSETTE MODULE

BACKGROUND OF THE INVENTION

FIELD OF THE INVENTION

This invention relates in general to strip holding cassettes and, in particular, to cassettes which have detachable cartridges.

Microfilm cassettes provide a compact means of storing and dispensing microfilm. A cassette comprising a first supply cartridge and a second take-up cartridge can be used as part of a document photography system such as described in U.S. patent application, Ser. No. 723,361, filed Sept. 15, 1976 in the name of Jack Beery, now U.S. Pat. No. 4,087,173. In such a system the microfilm is exposed after it leaves the first cartridge and before it enters the second cartridge. Exposed microfilm can be later processed after the second cartridge is filled with the exposed microfilm, or when it is desirable to process any exposed microfilm on the second cartridge after a predetermined time period. For example, after a day of microfilming, it is oftentimes desirable to process that day's exposures.

The U.S. patent to Verkinderen, No. 2,165,739, issued July 11, 1939 discloses a cassette having winding and unwinding chambers. The number of connecting pins and connecting sleeves are positioned symmetrically wherein one connecting pin is always opposite a corresponding connecting sleeve. A cover plate is secured in position after the film has been loaded into the cassette and is subsequently removed to enable the exposed film to be withdrawn.

The U.S. patent to Holliday, No. 3,701,495 issued Oct. 31, 1972 discloses a microfilm cassette having two film cartridges connected by a spacer unit which permits the cartridges to be placed adjacent one another. The microfilm is wound about the cartridge reel in each cartridge and passes from one cartridge reel in each cartridge and passes from one cartridge to another through rollers. The cartridge reels contain spindles through which the movement of the microfilm can be controlled in the cassette.

The present invention seeks to simplify an operator's job in removing exposed microfilm from a cassette and also to facilitate the addition or removal of a second cartridge in a simple and inexpensive fashion.

An assembly for housing strip material constructed in accordance with the instant invention comprises a first cartridge, a second cartridge, and a connecting means for detachably connecting the first cartridge to the second cartridge along an offset axis of the assembly. The offset extends through the pivot point and is perpendicular to the plane formed by the junction of the first cartridge and the second cartridge. Each of the first and second cartridges has a base plate and a cover plate secured together to define each of the cartridges. The connecting means pivotally connects the base plates together at a pivot point to allow for each of the cartridges to rotate about the offset axis at the pivot point.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
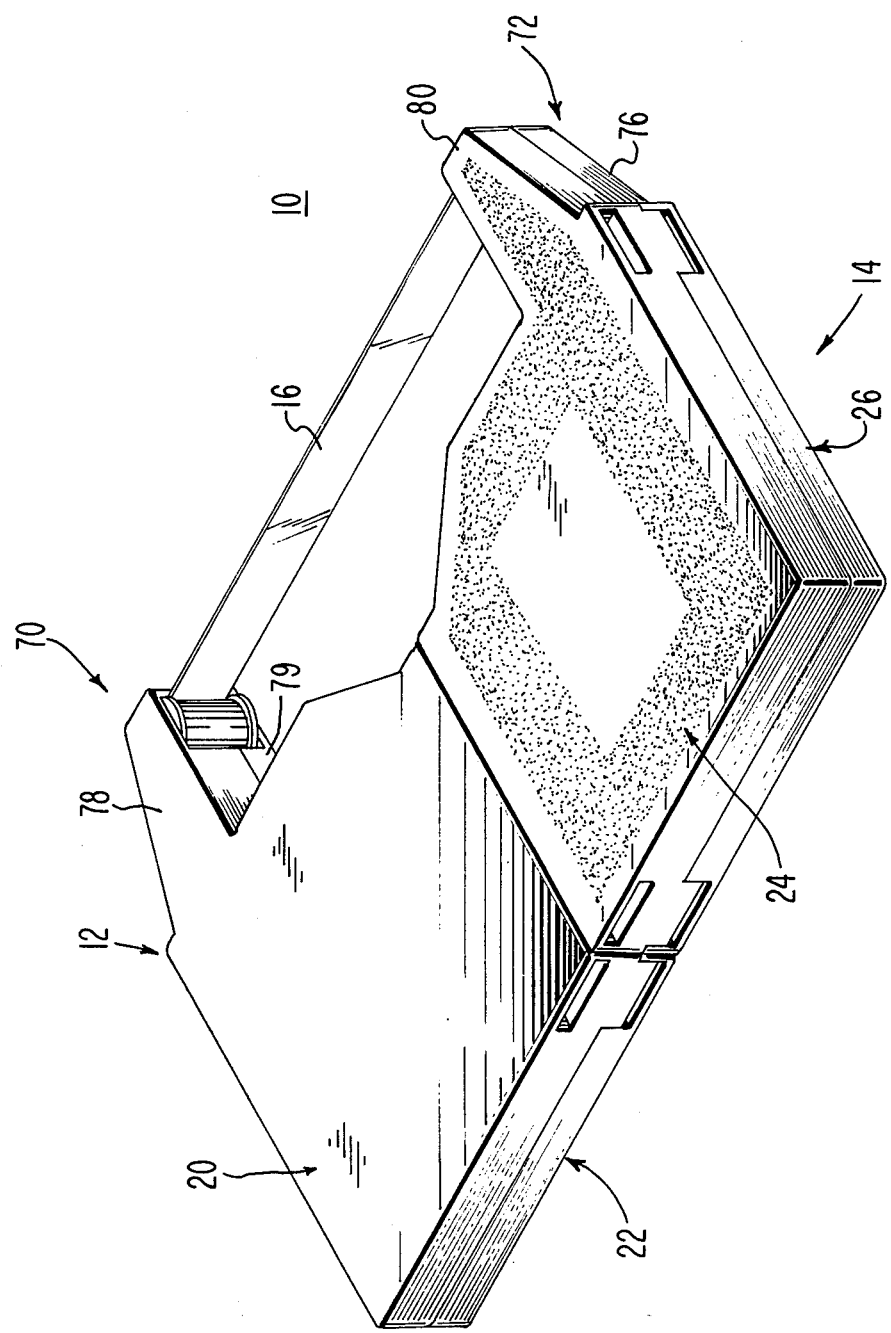
FIG. 1 shows the assembly having a strip of microfilm extending from one cartridge to the second cartridge of the assembly.

The subject matter of the present invention involves a microfilm tape cassette generally indicated at 10 in FIG. 1. The cassette 10 comprises a first, or a supply cartridge, generally indicated at 12, and a second or take-up cartridge, generally indicated at 14. As shown in FIG. 1, a strip of microfilm 16 extends between the two cartridges 12 and 14 along an offset axis 36 (shown in FIG. 2) of the cassette or cartridge pair 10.

A connecting means or a first connector assembly which comprises a male-female snap connector generally indicated at 18 detachably connects the first cartridge 12 to the second cartridge 14 along the offset axis 36 of the assembly 14 as will be described in greater detail hereinafter.

The first cartridge 12 has a cover plate generally indicated at 20 and a base plate generally indicated at 22. The second cartridge also includes a cover plate generally indicated at 24 and a base plate generally indicated at 26. The cover plate 20 and the base plate 22 define the first cartridge 12, and the cover plate 24 and the base plate 26 define the second cartridge 14.

The first connector assembly 18 is the subject of U.S. Pat. Nos. 3,988,808 and 3,015,869 assigned to the Hartwell Corporation of Placentia, California and the Illinois Tool Works, Inc. of Chicago, Ill. respectively. Basically, the '808 patent shows the subject connector assembly 18 with the anchor member of the '869 patent. It is sufficient here to say that the female portion 28 of the first connector assembly 18 extends through an aperture 29 and is fixedly secured about the aperture 29 at the top surface 30 of the base plate 26. The male portion 32 extends through an aperture 33 and is fixedly secured about the aperture 33 at the bottom surface 34 of the base plate 22.

When the male portion 32 is inserted in the female portion 28, there is sufficient frictional engagement between the male portion 32 and the female portion 28 to resist movement of the male portion 32 out of the female portion 28 until a certain threshold force is exerted to pull the male portion 32 out of the female portion 28. However, once the male portion 32 is inserted in the female portion 28, the male portion 32 can move relative to the female portion 28 by rotating about the offset axis 36. In this way the base plates 22 and 26 are pivotally connected together at a pivot point defined by the point of interconnection between the female portion 28 and the male portion 32 to allow each of the cartridges 12 and 14 to rotate about the longitudinal axis of the cassette 10 and the pivot point. In other words, while connected, the first cartridge 12 and the second cartridge 14 can move relative to each other by rotating at the pivot point about the offset axis 36.

Figure 2:
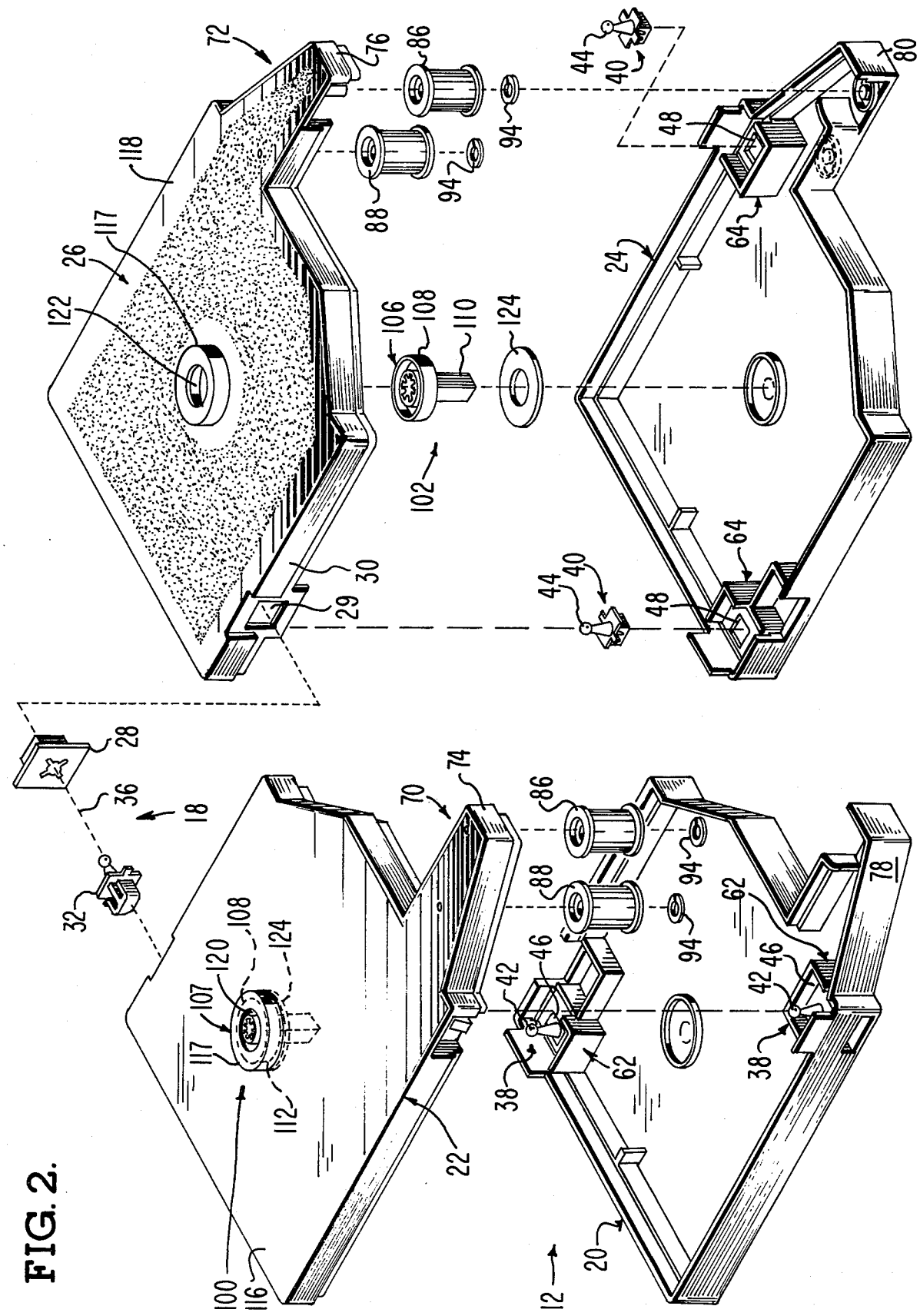
FIG. 2 shows the cassette of FIG. 1 in a disassembled condition with the reverse side of the cartridge of FIG. 1 appearing.

Each of the first and second cartridges 12 and 14 include fastener means, or a second connector assembly generally indicated at 38 and 40 respectively as shown in FIG. 2. The second connector assemblies 38 and 40 detachably fasten each of the cover plates 20 and 26 to their respective or corresponding base plates 22 and 24. The second connector assemblies 38 and 40 are substantially the same as the first connector assembly 18 as described in the above-noted patents. The male portions 42 and 44 of the respective first and second cartridges 12 and 14 are fixedly secured at their corresponding cover plates 20 and 24, respectively. The male portions 42 and 44 extend through apertures 46 and 48 respectively and are fixedly secured in a springing fashion about the said apertures 46 and 48 as described in the above-noted patents.

Figure 3:
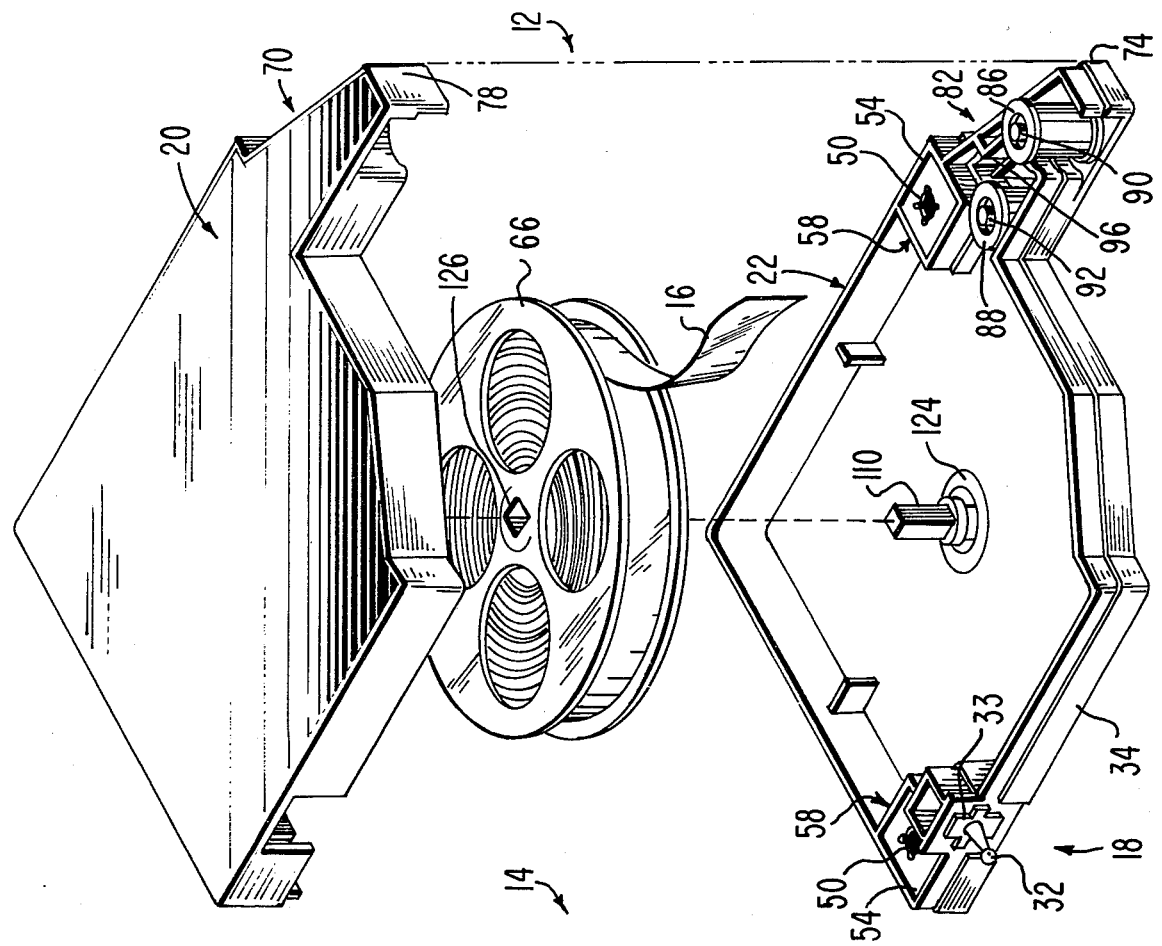
FIG. 3 shows the cartridge of FIG. 1 in a disassembled condition and also shows a supply reel of microfilm and a take-up reel in phantom.
Figure 3:
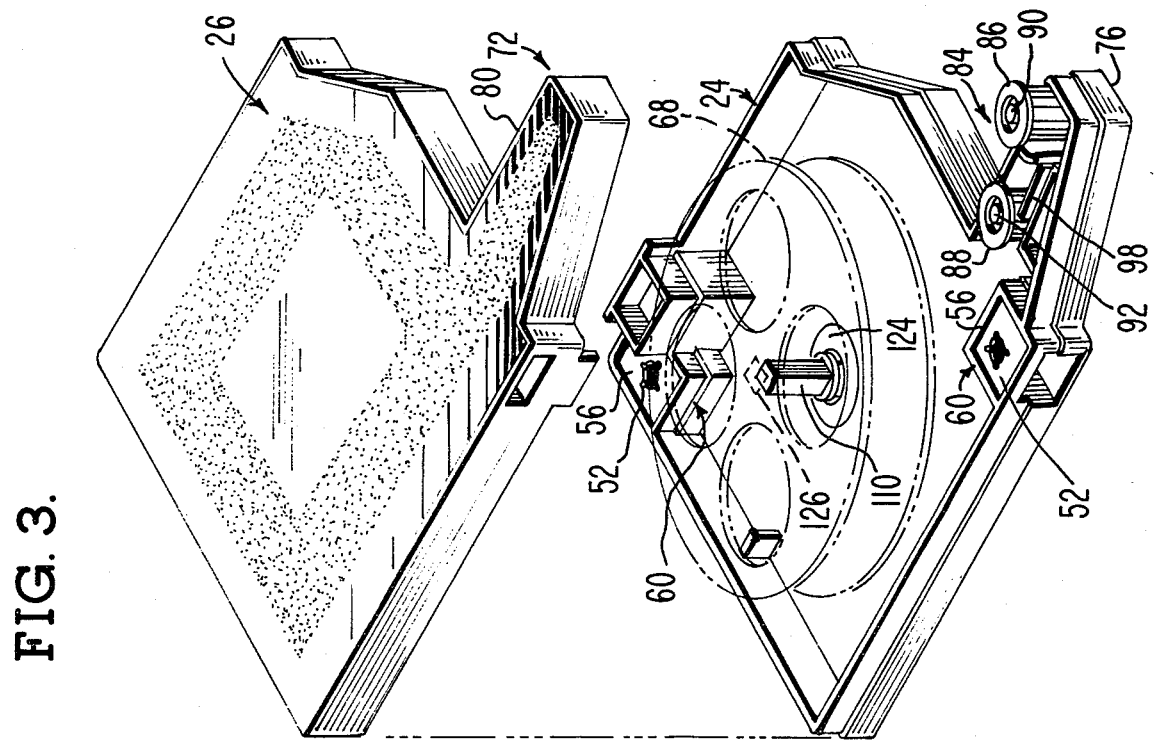

The second connector assemblies 38 and 40 also include female portions 50 and 52, respectively, which extend through apertures 54 and 56 respectively, about which they are secured thereabout, as also described in the above-noted patents. The apertures 54 and 56 are defined by built-up members generally indicated at 58 and 60, respectively, formed at opposite corners of the cover plates 22 and 24. Similarly, built-up structures 62 and 64 contain their respective male portions 42 and 44, respectively, such that when the base plates 22 and 24 are aligned with their corresponding cover plates 20 and 24 as shown in FIG. 3, the male portions 42 and 44 are aligned with their corresponding female portions 50 and 52 respectively so that the cover plates 20 and 26 can be brought together and detachably fastened or snapped to their corresponding base plates. Thereby, a cavity is formed therein each of the cartridges so a strip of material on reels such as reels 66 and 68 shown in phantom in FIG. 3 can be placed therein.

Each of the first and second cartridges 12 and 14 include a projecting member generally indicated at 70 and 72 respectively as shown in FIG. 1. The projecting members 70 and 72 are formed by the portions 74 and 76 of their base plates 22 and 24 respectively, and portions 78 and 80 of their corresponding cover plates 20 and 26 when the plates are secured together.

When the cartridges 12 and 14 are connected in their connected position, as shown in FIG. 1, the projecting members 70 and 72 are perpendicular to the offset axis 36 of the cassette and allow the strip material 16 to extend between the projecting members 70 and 72 to be exposed by a light source (not shown).

Each of the projecting members 70 and 72 include a roller means or a roller assembly generally indicated at 82 and 84 respectively. Each of the roller assemblies 82 and 84 include a pair of spools 86 and 88 respectively which are rotatably mounted on shafts 90 and 92 respectively, fixedly attached to the inner surface of the members 74 and 76 as shown in FIG. 2. Locking washers 94 secure the spools 86 and 88 to their respective shafts 90 and 92 so that the spools 86 and 88 can rotate thereabout their respective shafts 90 and 92.

The microfilm strip 16 extends about the roller 88 through passages 96 and 98 extending between the two spools 88 and 86 of each cartridge 12 and 14 respectively and thereafter about the spool 86 to extend therebetween the projecting members 70 and 72 as shown in FIG. 1.

Each of the base plates 22 and 24 include a rotatable dispensing means or dispensing assembly generally indicated at 100 and 102, respectively, in FIG. 2. Each dispensing assembly is adapted to receive a rotating drive member (not shown) at a spindle generally indicated at 104 and 106 of the dispensing assemblies 100 and 102 respectively. Each of the spindles 107 and 106 include a circular flange portion 108 and a square stem portion 110. The flange portion 108 is secured within a cylindrical cavity 112 defined by a doughnut-like member 117 integrally formed therewithin the upper surface 116 and 118 of the base plates 12 and 14 respectively. Apertures 120 and 122 extend through each of the doughnut-like members 117 through which the spindles 107 and 106, respectively, extend to be driven by the rotating drive members.

Washers 124 secure the spindles 107 and 106 to the undersurface of the base plates 12 and 14 respectively by applying an adhesive between the inner surface of the base plates 22 and 24 and the washers 124.

Each shaft 110 provides a rectangular surface to accept a spool or reel 66 having a rectangular slot 126 extending therethrough to thereby dispense the strip material 16 to its corresponding roller assembly 82 and 84 as shown in FIG. 3.

The invention has been described in an illustrative manner and it is to be understood that the terminology which has been used is intended to be in the nature of words of description rather than of limitation.

Obviously, many modifications and variations of the present invention are possible in light of the above teachings. It is therefore to be understood that within the scope of the appended claims, the invention may be practiced otherwise than as specifically described.

The embodiments of the invention in which an exclusive property or privilege is claimed are defined as follows:

1. An assembly for housing strip material comprising:
   a first cartridge;
   a second cartridge;
   connecting means for detachably connecting said first cartridge to said second cartridge in a connected position along an axis of the assembly, said axis being perpendicular to a plane formed by the junction of said first and second cartridges and extending through a pivot point, each of said first and second cartridges having a base plate and a cover plate fastened together to define each of said cartridges, said connecting means pivotably connecting said base plates together at said pivot point to allow each of said cartridges to rotate about said axis at said pivot point;
   fastener means for detachably fastening each of said cover plates to said corresponding base plate;
   a first projecting member connected to said first cartridge and perpendicular to said axis; and
   a second projecting member connected to said second cartridge and perpendicular to said axis, said projecting members being spaced from said axis to locate a portion of a strip material to extend parallel to and spaced from said axis between said first and second projecting members.

2. The assembly as defined in claim 1 wherein each of said projecting members includes a roller means for rotatably dispensing the strip material.

3. The assembly as defined in claim 2 wherein the bottom surface of said first cartridge abuttingly engages the top surface of said second cartridge about said pivot point, said connecting means connecting said first cartridge to said second cartridge.

4. The assembly as defined in claim 3 wherein said connecting means and said fastener means comprise a male-female snap connector.

5. The assembly as defined in claim 4 wherein each of said base plates includes a rotatable dispensing means adapted to receive a rotating drive member for dispensing a roll of the strip material to said corresponding roller means.

* * * * *